(12) United States Patent
Latimer et al.

(10) Patent No.: US 8,353,342 B2
(45) Date of Patent: Jan. 15, 2013

(54) STEAM GENERATION FOR STEAM ASSISTED OIL RECOVERY

(75) Inventors: Edward G. Latimer, Ponca City, OK (US); Steven A. Treese, Katy, TX (US)

(73) Assignee: ConocoPhillips Company, Houston, TX (US)

( * ) Notice: Subject to any disclaimer, the term of this patent is extended or adjusted under 35 U.S.C. 154(b) by 264 days.

(21) Appl. No.: 12/707,409

(22) Filed: Feb. 17, 2010

(65) Prior Publication Data
US 2010/0212894 A1 Aug. 26, 2010

Related U.S. Application Data

(60) Provisional application No. 61/154,200, filed on Feb. 20, 2009.

(51) Int. Cl.
*E21B 43/24* (2006.01)
(52) U.S. Cl. ..................................................... 166/272.3
(58) Field of Classification Search ......................... None
See application file for complete search history.

(56) References Cited

U.S. PATENT DOCUMENTS

| | | | |
|---|---|---|---|
| 4,498,542 A | 2/1985 | Eisenhawer et al. | |
| 4,604,988 A | 8/1986 | Rao | |
| 4,648,835 A | 3/1987 | Eisenhawer et al. | |
| 4,869,894 A | 9/1989 | Wang et al. | |
| 5,758,605 A | 6/1998 | Calkins | |
| 6,206,684 B1 | 3/2001 | Mueggenburg | |
| 6,389,814 B2* | 5/2002 | Viteri et al. | 60/716 |
| 7,293,532 B2 | 11/2007 | Reinhardt et al. | |
| 7,481,275 B2* | 1/2009 | Olsvik et al. | 166/303 |
| 2006/0231252 A1* | 10/2006 | Shaw et al. | 166/272.3 |
| 2006/0272813 A1* | 12/2006 | Olsvik et al. | 166/272.3 |
| 2007/0202452 A1 | 8/2007 | Rao | |

OTHER PUBLICATIONS

Ian Lindsay, Energy Procedia 00 (2008) 000-000, Designing a Climate Friendly Hydrogen Plant, (ScienceDirect), 2008 Elsevier Ltd.

* cited by examiner

*Primary Examiner* — Terry Melius
*Assistant Examiner* — Silvana Runyan
(74) *Attorney, Agent, or Firm* — ConocoPhillips Company

(57) ABSTRACT

Methods and apparatus relate to both generating steam for injection into a wellbore and capturing carbon dioxide ($CO_2$) produced when generating the steam. A direct steam generator (DSG) makes the steam by contacting water with a combustion area for hydrogen and oxygen. Quantity of the steam made exceeds quantity of water input into the steam generator since the steam includes vaporized water resulting from combustion of the hydrogen and oxygen mixed with the water inputted and heated. Steam-methane-reforming or autothermal-reforming produces the hydrogen stripped of the $CO_2$ prior to introduction into the steam generator. Further, an air separation unit supplies the oxygen to the steam generator.

10 Claims, 3 Drawing Sheets

STEAM GENERATION FOR STEAM ASSISTED OIL RECOVERY

CROSS-REFERENCE TO RELATED APPLICATIONS

None

STATEMENT REGARDING FEDERALLY SPONSORED RESEARCH OR DEVELOPMENT

None

FIELD OF THE INVENTION

Embodiments of the invention relate to methods and systems for steam assisted oil recovery and carbon dioxide capture.

BACKGROUND OF THE INVENTION

In order to recover oils from certain geologic formations, injection of steam increases mobility of the oil within the formation. An example of such a process is known as steam assisted gravity drainage (SAGD). Various techniques can provide for steam generation in SAGD but with certain disadvantages.

Given quantity of the steam required for the SAGD, energy needed for the steam generation represents a substantial cost for the SAGD. In addition to the cost, other viability criteria of the steam generation for the SAGD relate to production of carbon dioxide ($CO_2$) and water input requirements. For example, many governments regulate $CO_2$ emissions. High costs relative to another option for the steam generation can prevent use of some options for the steam generation regardless of ability to provide desired criteria, such as with respect to the production of $CO_2$.

Burning gas or oil to fuel burners that heat steam generating boilers creates $CO_2$, which is a greenhouse gas that can be captured by various approaches. While further adding to the cost, capturing the $CO_2$ from flue gases of the burners facilitates in limiting or preventing emission of the $CO_2$ into the atmosphere. In contrast to indirect heating with the boilers, prior direct combustion processes inject steam and $CO_2$ together into the formation even though injection of the $CO_2$ into the formation may not be desired or acceptable in all applications.

Regarding the water input requirements, inability to recycle all of the steam injected results from having to remove impurities such as sodium chloride from any recovered water prior to the recovered water being combined with other make-up water to feed any steam generation. Limited water supplies for the make-up water at locations of where SAGD is applicable can prevent feasibility of the steam generation. Even if available, expense of purchasing water can add to cost for the SAGD.

Therefore, a need exists for improved methods and systems for steam injection and $CO_2$ capture.

SUMMARY OF THE INVENTION

In one embodiment, a system for steam assisted oil recovery includes a reformer to convert hydrocarbon and process steam into carbon dioxide and hydrogen. A purification unit receives the hydrogen and the carbon dioxide from the reformer. The carbon dioxide is separable from the hydrogen within the purification unit. A direct steam generator makes injection steam based on the hydrogen from the purification unit and an oxygen-containing fluid from a supply being combustible within the steam generator in presence of water. The steam generator is coupled to convey the injection steam into an injection well.

According to one embodiment, a method provides steam assisted recovering of oil. The method includes converting hydrocarbon and process steam into carbon dioxide and hydrogen and separating the carbon dioxide from the hydrogen. Combusting the hydrogen and an oxygen-containing fluid in presence of water produces injection steam. Further, the method includes supplying the injection steam into an injector well.

For one embodiment, a method of steam assisted recovering of oil includes reforming natural gas to produce carbon dioxide and hydrogen, separating the carbon dioxide from the hydrogen, and separating oxygen from other air components. The method further includes generating steam by introducing the hydrogen and the oxygen into a combustion area where the hydrogen and the oxygen are ignited and contacting water with the combustion area. The steam injected into an injection well includes products from combustion of the hydrogen and the oxygen and the water vaporized by heat from the combustion. Sequestering the carbon dioxide takes place independent of injecting the steam into the injection well.

BRIEF DESCRIPTION OF THE DRAWINGS

The invention, together with further advantages thereof, may best be understood by reference to the following description taken in conjunction with the accompanying drawings.

DETAILED DESCRIPTION OF THE INVENTION

Embodiments of the invention relate to methods and systems that include both generating steam for injection into a wellbore and capturing carbon dioxide ($CO_2$) produced when generating the steam. A direct steam generator makes the steam by contacting water with a combustion area for hydrogen and oxygen. Quantity of the steam made exceeds quantity of water input into the steam generator since the steam includes vaporized water resulting from combustion of the hydrogen ($H_2$) and oxygen ($O_2$) mixed with the water inputted and heated. Steam-methane-reforming or autothermal-reforming produces the hydrogen stripped of the $CO_2$ prior to introduction into the steam generator. Further, an air separation unit supplies the oxygen to the steam generator.

Figure 1:
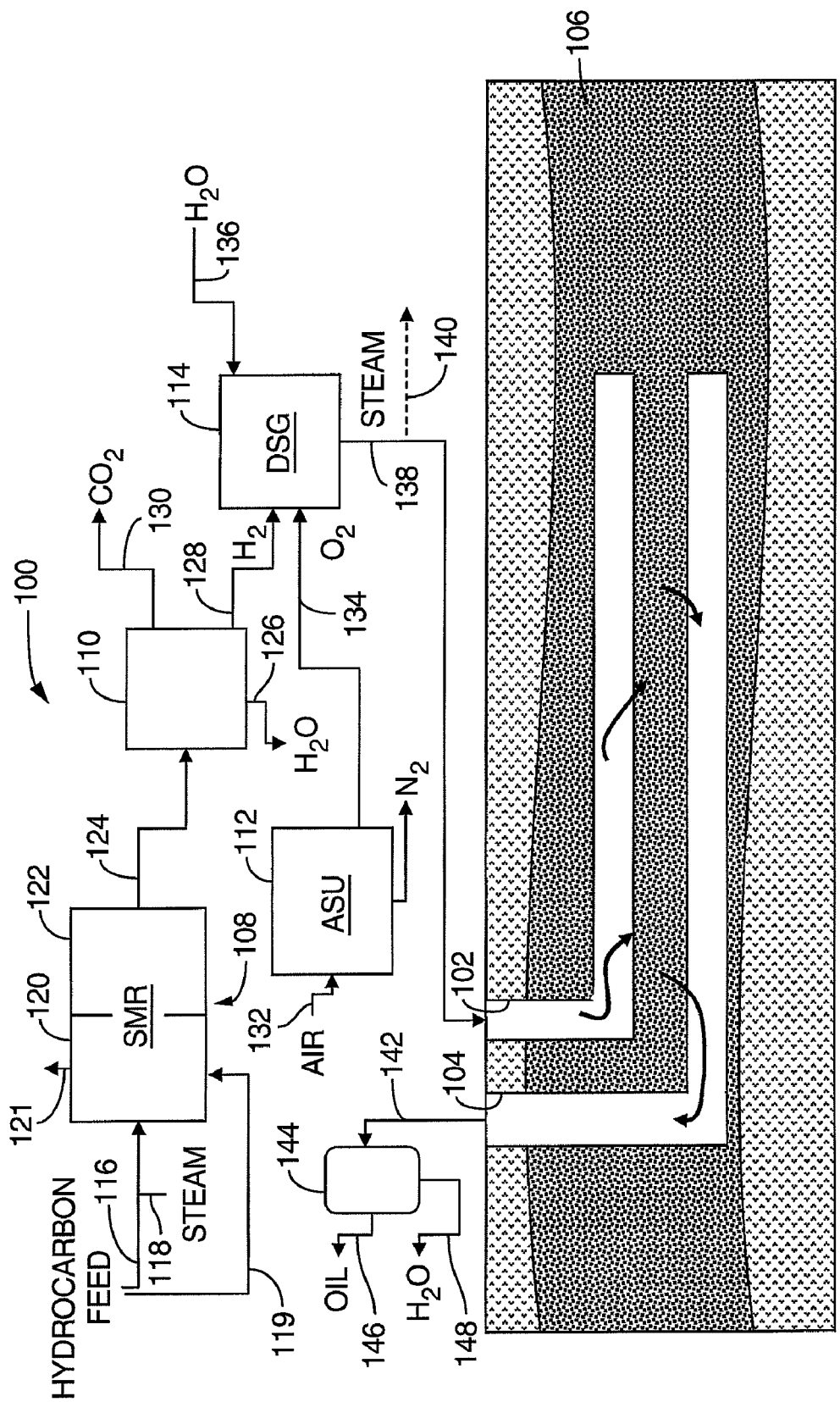
FIG. 1 is a schematic of a steam assisted oil recovery system with a steam-methane-reformer and an air separation unit both supplying a direct steam generator that produces steam for injection, according to one embodiment of the invention.

FIG. 1 illustrates a steam assisted oil recovery system 100 having an injection well 102 and a production well 104 disposed in an oil bearing formation 106. The system further includes a steam-methane-reformer (SMR) 108, a hydrogen purification unit 110, and an air separation unit (ASU) 112 all coupled to supply a direct steam generator (DSG) 114 that produces steam for injection into the injection well 102.

In operation, a hydrocarbon feed 116, which may be preheated, combines with process steam 118 to create a pressurized mixture that passes inside a primary reformer 120 of the SMR 108. For some embodiments, the hydrocarbon feed 116 includes a methane-containing mixture (e.g., natural gas), natural gas liquids, and/or naphtha. The primary reformer 120 defines a heated furnace where reactants including the steam ($H_2O$) and methane ($CH_4$) form products of carbon monoxide (CO), $CO_2$ and $H_2$. The primary reformer 120 thus may contain an appropriate catalyst to promote such steam-methane reforming reaction. A furnace fuel line 119 supplies hydrocarbons burned for heating of the primary reformer 120. Flue gases generated from combustion to heat the primary reformer 120 exit the SMR 108 via an exhaust 121. For some embodiments, the flue gases in the exhaust 121 may pass through $CO_2$ scrubbers to further limit emissions of $CO_2$. Since nitrogen makes up a majority of the flue gases, capturing the $CO_2$ from the exhaust 121 may occur separate from the purification unit 110. In a shift reformer 122 of the SMR 108, the steam that is unconverted in the primary reformer 120 and the CO produced in the primary reformer 120 react to produce $CO_2$ and $H_2$. This water gas shift conducted in the shift reformer 122 may utilize catalysts such as chrome-promoted iron oxide and/or copper-zinc (CuZn) supported on alumina ($Al_2O_3$).

A product stream 124 exits the SMR 108 and is input into the purification unit 110. The product stream 124 contains the $CO_2$, the $H_2$ and any of the CO, the $CH_4$, and the steam that remains unconverted. The purification unit 110 separates overhead vapor from liquid that forms a water recycle stream 126. The purification unit 110 further strips the $CO_2$ from the $H_2$. In some embodiments, the purification unit 110 utilizes a selective amine solution to strip the $CO_2$ from the $H_2$ by absorption of the $CO_2$ within the solution. Instead of the amine solution, alternative exemplary types of the purification unit 110 may employ physical solvent processes or carbonate processes, such as potassium carbonate based operations. The amine solution comes in direct contact with the $CO_2$ and the $H_2$. The $H_2$ exits the purification unit 110 via a burner fuel input 128 that supplies the $H_2$ into the direct steam generator 114.

Monoethanolamine (MEA), diethanolamine (DEA), and methyldiethanolamine (MDEA) are examples of aqueous amine solutions in some embodiments. Once the amine solution has been used to separate the $CO_2$, the amine solution can be regenerated. For some embodiments, liberation of the $CO_2$ from the amine solution may occur with temperature increase and pressure reduction driven in an indirect reboiler by heat from steam. A $CO_2$ output 130 from the purification unit 110 contains fluid with the $CO_2$ for subsequent compressing and/or sequestering to avoid emitting the $CO_2$ into the atmosphere.

The burner fuel input 128 may also contain at least some of the CO and the $CH_4$ that remains unconverted. For example, the $H_2$ may account for about 95% of the fuel input 128 with about 5% of the fuel input 128 being the CO and the $CH_4$ that remains unconverted. While possible to achieve higher purity of the $H_2$ in the fuel input 128, increase in purity of the $H_2$ tends to lower recovery of the $H_2$ and may not be necessary for use in supplying the direct steam generator 114.

Air enters the air separation unit 112 through an air intake 132. The air separation unit 112 compresses and cools the air to about $-185°$ C. and then separates $O_2$ out from other components of the air by cryogenic fractional distillation since the $O_2$ has a different boiling point than the other components, such as argon and nitrogen. The $O_2$ exits the air separation unit 112 via a burner oxidant input 134 that supplies the $O_2$ into the direct steam generator 114.

The $O_2$, from the burner oxidant input 134, and the $H_2$, from the burner fuel input 128, mix in a combustion area of a burner for the steam generator 114 and are ignited. While increasing concentration of the $O_2$ in the burner oxidant input 134 raises temperature of combustion and reduces handling of inert air constituents, some embodiments utilize the air that is compressed without separation. Examples of oxygen-containing fluid within the burner oxidant input 134 thereby include the air and/or the $O_2$ from the air separation unit 112.

A water supply 136 introduces water into direct contact with the combustion area in the steam generator 114 to cool intense temperatures resulting from burning of the $H_2$. Unlike indirect steam generators that use boilers to contain water and separate the water from burner flames, the direct steam generator 114 places the water used to make steam in the direct contact and fluid communication with the combustion area or a flame, which is also in fluid communication with the injection well 102. Transfer of heat from the flame to the water introduced through the water supply 136 into the steam generator 114 vaporizes the water into steam. Further, combustion of the $H_2$ and the $O_2$ also generates vaporized water mixed in with the steam that exits the steam generator via injection steam flow 138. Quantity of the steam made and output through the injection steam flow 138 thereby exceeds quantity of the water input into the steam generator 114 from the water supply 136. For example, flow rate of water through the injection steam flow 138 may be between 20% and 25% greater than flow rate of water input coming from the water supply 136. As discussed further herein, this increase in water may be sufficient to enable net water production with the system 100 such that the system 100 is self contained for water needs.

In a steam assisted gravity drainage (SAGD) operation, the injection steam flow 138 from the steam generator 114 directs steam at a pressure of 1400 psig, for example, into the injection well 102 to fluidize the oil bearing formation 106. The injection steam flow 138 may include the steam alone or in combination with other injectants or solvents. The steam from the injection steam flow 138 eventually condenses to create an oil/water mixture that migrates through the formation 106. The oil/water mixture is gathered at the production well 104 through which the oil/water mixture is recovered to surface via production line 142. For some embodiments, the injection well 102 includes a horizontal borehole portion that is disposed above (e.g., 4 to 6 meters above) and parallel to a horizontal borehole portion of the production well 104. A separator 144 separates the oil/water mixture within the production line 142 and provides an oil product 146 and recovered water 148.

For some embodiments, part of the steam produced by the steam generator 114 may form a steam bypass 140 for supplying the process steam 118 and/or any steam requirements for the purification unit 110. Quality of the steam required for the process steam 118 may limit ability to use the steam from the steam bypass 140 for inputting into the SMR 108. A separate steam generator, such as another direct steam generator, may reheat part of the water recycle stream 126 with additional purified water, which may come from the recovered water 148, in order to resupply the process steam 118. The recovered water 148 and the water recycle stream 126, or any waste water from the water recycle stream 126 and/or the recovered water 148 not utilized to resupply independent steam generating for the process steam 118, may be recycled as the water supply 136 for the steam generator 114.

In some embodiments, selection of a molar steam to carbon (S/C) ratio based on flows providing the hydrocarbon feed 116 and the process steam 118 can facilitate in achieving a desired water balance for the system 100. Decreasing the S/C ratio increases amount of the hydrocarbon feed 116 consumed to produce as much of the hydrogen as produced at relatively higher values for the S/C ratio. While increasing fuel costs and reducing purity of the hydrogen from the SMR 108, decreasing the S/C ratio results in less water consumed by the SMR 108 to produce as much of the hydrogen as produced at relatively higher values for the S/C ratio. Depending on the selection of the S/C ratio, aforementioned gain in water with the steam generator 114 may be sufficient to replenish water consumed in the SMR 108 and lost in a waste stream from purification of the water recycle stream 126. The gain in water with the steam generator 114 may further compensate any loss for treatment of the recovered water 148 used to resupply the water supply 136 for the steam generator 114. For example, treatment of the recovered water may account for a 7% reduction in flow rate of water from the recovered water 148 available for recirculation as the water source 136 relative to flow rate of water through the injection steam flow 138.

While shown on surface, some embodiments include the steam generator 114 disposed within the injection well 102. The purification unit 110 produces the $CO_2$ output 130 such that the $CO_2$ can be directed at surface as desired regardless of location of the steam generator 114. Further, the $CO_2$ output 130 provides independent ability to handle the $CO_2$ produced since at least some of the $CO_2$ produced by the system 100 in order to generate steam is isolated ahead of the steam generator 114 instead of being mixed within the injection steam flow 138, which may contain less than 1% $CO_2$ concentration. Sequestering any part or all of the $CO_2$ from the $CO_2$ output 130 can thus occur at an offsite location (e.g., a sealed formation isolated from the oil bearing formation 106) if desired not to inject into the injection well 102 any percentage of the $CO_2$ from the $CO_2$ output 130.

Figure 2:
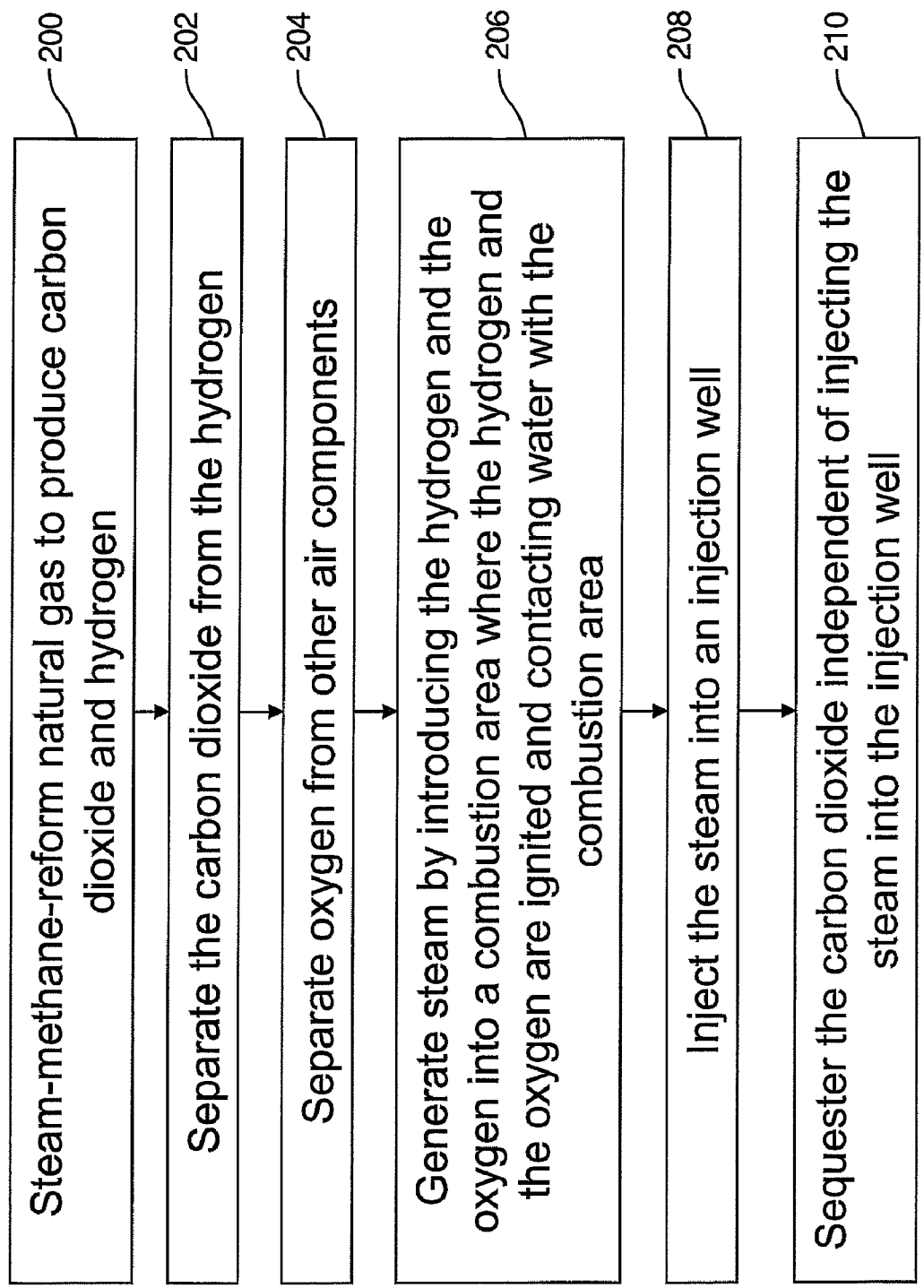
FIG. 2 is a flow chart illustrating a method of recovering oil assisted by steam, which is produced by contacting water with a combustion area for hydrogen and oxygen products respectively made by steam-methane-reforming and separating air, according to one embodiment of the invention.

FIG. 2 illustrates a method of steam assisted recovering of oil. In hydrogen production step 200, steam-methane-reforming of natural gas produces carbon dioxide and hydrogen. Purification step 202 separates the carbon dioxide from the hydrogen. Separating oxygen from other air components occurs in oxygen production step 204. Steam generating step 206 includes introducing the hydrogen and the oxygen into a combustion area where the hydrogen and the oxygen are ignited and contacting water with the combustion area to produce steam. Injecting the steam into an injection well in injector step 208 takes place independent of carbon capture step 210, which includes sequestering the carbon dioxide.

Figure 3:
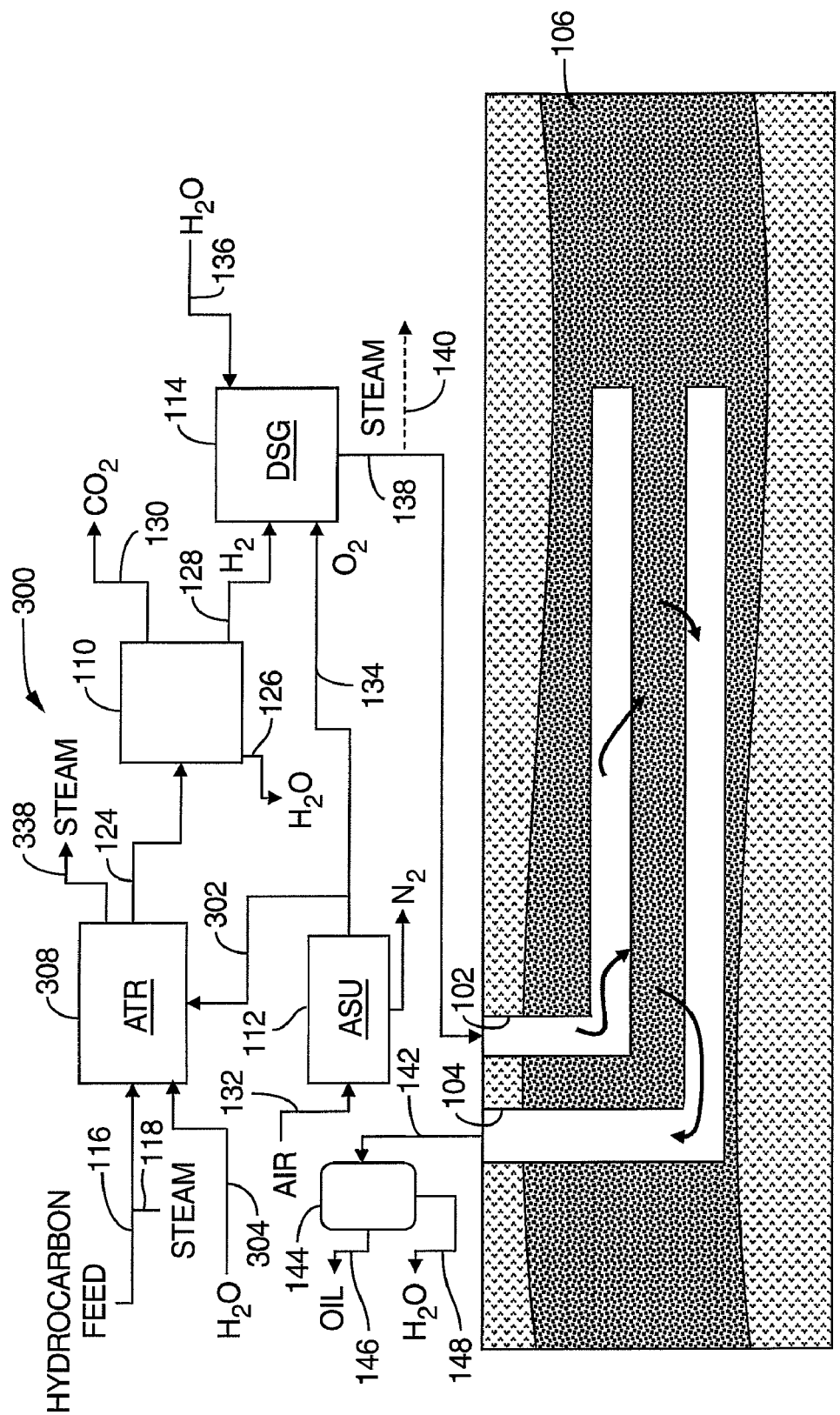
FIG. 3 is a schematic of a steam assisted oil recovery system with an autothermal-reformer and an air separation unit both supplying a direct steam generator that produces steam for injection, according to one embodiment of the invention.

FIG. 3 shows another steam producing system 300 with an autothermal-reformer (ATR) 308 instead of a steam-methane-reformer described herein. For conciseness, the steam producing system 300 includes various analogous components and features shown in FIG. 1 and identified by common reference numbers. The ATR 308 eliminates production of flue gases in a separate stream and hence emissions of $CO_2$ from reforming since the purification unit 110 enables recovery of the $CO_2$ generated within the ATR 308.

In operation, the $O_2$ that exits the air separation unit 112 splits into the burner oxidant input 134 for the DSG 114 and a reformer oxygen input 302 coupled to the ATR 308. The reformer oxygen input 302 supplies oxygen into a single area where the hydrocarbon feed 116 and the process steam 118 are introduced into the ATR 308. Some of the methane from the hydrocarbon feed 116 oxidizes in an exothermic reaction in presence of the oxygen to produce heat required for the reforming within the ATR 308. The ATR 308 includes appropriate catalysts and thereby converts, without any separate heating, reactants including the steam, $O_2$ and $CH_4$ into products of CO, $CO_2$ and $H_2$.

Utilizing the ATR 308 may provide economic advantages for $CO_2$ capture relative to employing the SMR 108. In particular, the steam producing system 300 illustrated in FIG. 3 eliminates from the recovery system 100 shown in FIG. 1 the exhaust 121 where the $CO_2$ is diluted by nitrogen. The steam producing system 300 may enable reaching desired $CO_2$ emission levels without handling and separating out the nitrogen from the exhaust 121 as may be necessary for attaining equivalent $CO_2$ emission levels with the recovery system 100.

In some embodiments, heat exchanging within the ATR 308 generates a steam output 338 from a water stream 304. The steam output 338 may supply the process steam 118, provide any steam requirements for the purification unit 110 and/or combine with the injection steam flow 138. Given the operation of the ATR 308, all combustion products used to generate the steam output 338 pass through the product stream 124 to the purification unit 110 such that no $CO_2$ emissions are associated with producing the steam output 338, which may form the process steam 118.

The preferred embodiment of the present invention has been disclosed and illustrated. However, the invention is intended to be as broad as defined in the claims below. Those skilled in the art may be able to study the preferred embodiments and identify other ways to practice the invention that are not exactly as described herein. It is the intent of the inventors that variations and equivalents of the invention are within the scope of the claims below and the description, abstract and drawings are not to be used to limit the scope of the invention.

The invention claimed is:

1. A system for steam assisted oil recovery, comprising:
   a reformer to convert hydrocarbon and process steam into carbon dioxide and hydrogen;
   a purification unit coupled to receive the hydrogen and the carbon dioxide from the reformer, wherein the carbon dioxide is separated from the hydrogen within the purification unit;
   a supply for an oxygen-containing fluid;
   a direct steam generator to make injection steam based on the hydrogen from the purification unit and the oxygen-containing fluid from the supply being combustible within the steam generator in presence of water, wherein the steam generator is coupled to convey the injection steam into an injection well; and
   a carbon dioxide output coupled to the purification unit for sequestering the carbon dioxide independent of the injection steam conveyed into the injection well.

2. The system according to claim 1, wherein the reformer includes an autothermal-reformer.

3. The system according to claim 1, wherein the supply for the oxygen-containing fluid includes an air separation unit that is cryogenic distillation based.

4. The system according to claim 1, wherein the reformer includes a water gas shift reactor to convert carbon monoxide and the process steam into at least some of the carbon dioxide and the hydrogen.

5. The system according to claim 1, further comprising a separator coupled to receive fluid from a production well in fluid communication through a formation with the injection well, wherein the separator is coupled to supply the water to the steam generator.

6. The system according to claim 1, wherein the water is passable through the steam generator and is in fluid communication with the injection well and where the hydrogen and the oxygen-containing fluid combust.

7. A method of steam assisted recovering of oil, comprising:
reforming natural gas to produce carbon dioxide and hydrogen;
separating the carbon dioxide from the hydrogen;
separating oxygen from other air components;
generating steam by introducing the hydrogen and the oxygen into a combustion area where the hydrogen and the oxygen are ignited in presence of water with the combustion area;
injecting the steam into an injection well, wherein the steam includes products from combustion of the hydrogen and the oxygen and the water vaporized by heat from the combustion; and
sequestering the carbon dioxide independent of injecting the steam into the injection well.

8. The method according to claim 7, wherein generating steam produces a net water gain greater than a water loss from the reforming.

9. The method according to claim 7, further comprising supplying part of the steam as a reactant for the reforming.

10. The method according to claim 7, wherein the reforming includes combusting in an autothermal-reformer the natural gas and part of the oxygen that is separated.

* * * * *